Aug. 8, 1950     J. C. SPINDLER     2,517,805
PHASE DIFFERENCE INDICATOR
Filed Nov. 2, 1946

INVENTOR.
JOSEPH C. SPINDLER
BY
ATTORNEY

Patented Aug. 8, 1950

2,517,805

UNITED STATES PATENT OFFICE 2,517,805

PHASE DIFFERENCE INDICATOR

Joseph C. Spindler, Chicago, Ill., assignor to The Rauland Corporation, Chicago, Ill., a corporation of Illinois Application November 2, 1946, Serial No. 707,505

2 Claims. (Cl. 172—245.1)

This invention relates to electrical apparatus and, more particularly, to apparatus for indicating directly the difference in phase between two alternating voltages.

In various of the electrical arts, and in particular in the radio and television arts, it is highly desirable to have apparatus by which the phase difference of two voltages can be ascertained easily and directly. According to present practices, the phase difference between two voltages is ascertained in any one of several ways. One way is to take certain experimental data and to make mathematical calculations based thereon. Another is to use a cathode ray oscilloscope and an electronic switch so that the time relationships of a plurality of voltage wave forms can be directly observed on the oscilloscope screen. Recently it has been possible to obtain this information by the use of a direct reading device whose circuits include an electro-mechanical component, i. e. a goniometer. The first method is inconvenient and slow, and requires unusual skill in mathematics. The second method involves the use of expensive and specialized apparatus. The third has well known limitations which result from the use of an electro-mechanical device as well as the frequency pass band limitations of goniometers.

It is an object of this invention to devise a simple and inexpensive device having two input connections adapted to receive voltages whose phase difference is to be ascertained and having an indicator element directly scaled in degrees, and to arrange its circuits and components so that the phase difference between the two voltages fed to the inputs may be derived readily by directly reading the indicator.

It is another object of this invention to use "electronic" components instead of a goniometer.

Other objects, advantages and features of this invention will be apparent from the following description thereof and from the drawing, in which.

Figure 1:
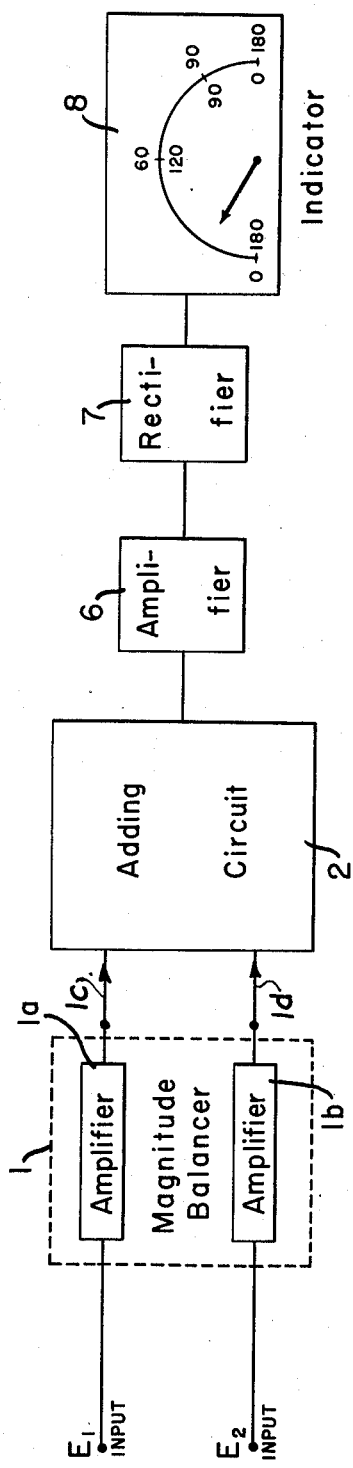
Fig. 1 is a schematic block diagram of one embodiment of this invention.

Block 1 of Fig. 1 may be designated as a magnitude balancer or equalizer. It has two inputs and two outputs. The function of this block is separately to amplify or attenuate either or both (or even to amplify one and attenuate the other) of the voltages fed, respectively, into its two inputs, so that the magnitudes of the voltages coming from its two outputs are equal and are suitable to the requirements of the components to which they are fed. It is obvious that mere equalization may be obtained by employing some magnitude-changing means in only one of the channels of the equalizer, e. g. between one of the inputs and the output associated with it. Then, by appropriately attenuating (or increasing) the magnitude of one of the input voltages, it may be matched to the other, whatever that magnitude may be, so that the outputs are the same. However, it is preferable to use a more flexible arrangement and to include a block 1 means for altering in either direction the magnitudes of both of the input voltages. In this way, besides equalizing the two input voltages in the magnitude balancer, they may be adjusted to a convenient amplitude for use in the succeeding component.

As shown in the embodiment of Fig. 1, two amplifiers are employed in the magnitude balancer and are designated, respectively, as blocks 1a and 1b. By the use of perfectly conventional design practices these amplifiers may be made controllable as to their amplification. This will permit controllable increases in magnitudes. In addition to this, particularly in embodiments intended for use at audio frequencies (at which the reactive component of a resistor is small), the input circuits of these amplifiers may be made to include potentiometers so that the actually used input voltages for the amplifiers may be taken therefrom and thus may be any desired fractional parts of the external input voltages . . . parts thereof which have appropriate magnitudes for use in the amplifiers of the magnitude balancer. If the potentiometers be correctly arranged, the over-all effect of the magnitude balancer may be, when desired, reducing rather than amplifying, despite the presence of amplifiers in series between the inputs and the outputs.

As will be more apparent after a description of other portions of this device, a magnitude balancer, such as block 1 described above, is not an essential component of an all-electronic direct reading phase difference indicator according to this invention. However, it is a component which tends to improve the performance of such an indicator and, accordingly, is included in preferred embodiments.

As will be explained more fully below, blocks 1a and 1b should cause equal phase shifts in the voltages passing through them so that the remaining components, which are adapted to determine the phase difference between the two outputs of the magnitude balancer, will yield a true indication of the phase difference between the original input voltages under test. Since blocks 1a and 1b ordinarily will be adjusted to offer unequal amounts of amplification, it follows that any possible phase shifts caused by these amplifiers must not be functions of gain, i. e. must not vary with variations in gain. If these amplifiers are of the well known resistance-coupled variety and if they employ matched circuit elements including matched tubes, and if the load resistor of each amplifier has a small value of resistance as compared with the plate resistance of the tube, and if they employ cathode bias gain controls, then over a wide range of values of the ratio of the gain of one to that of the other, these two amplifiers will have relatively equal phase shifts. Such circuits in themselves are well known and do not as such comprise the subject matter of this invention.

The frequency ranges of particular embodiments of this device can be extended by tuning the input and output circuits of the amplifiers which it employs. If such tuning should be employed in either or both of the amplifiers of block 1, this may, under certain conditions, result in the introduction of unequal phase shifts by the individual amplifiers 1a and 1b. Any such unequal phase shifts must be corrected. This can be done by the use of phase compensation networks included in the circuits of either or both of these amplifiers and designed along conventional lines.

The outputs of blocks 1 are respectively fed over switches 1c and 1d, when they are closed, into two input channels of adding circuit 2 which, in effect, causes the two input voltages to be added vectorially (and, which is unimportant, may multiply that vector sum by a constant due to the combined gain of the vacuum tube stages employed in the adding circuit). Switches 1c and 1d make it feasible to feed the outputs of block 1 to block 2 either simultaneously or one at a time.

Figure 2:
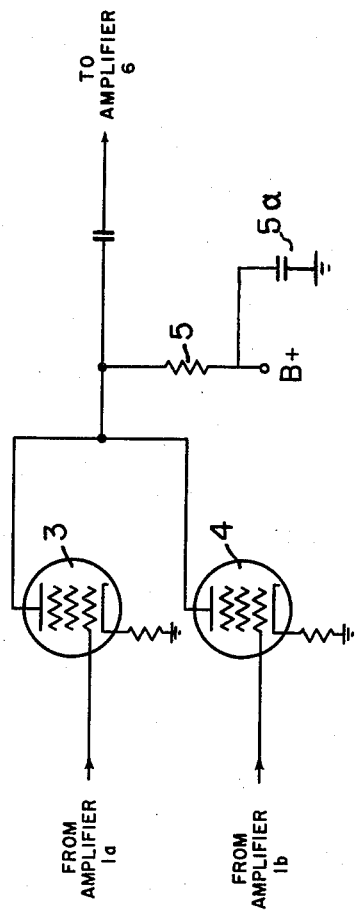
Fig. 2 is a skeleton schematic circuit diagram of a portion of the device shown in Fig. 1.

A schematic circuit diagram of the essential nature of the adding circuit is shown in Fig. 2 in skeleton form, i. e. conventional connections for heaters, screen grids, suppressor grids, etc. are omitted. Tubes 3 and 4 are arranged in a circuit comprising two vacuum tube amplifiers having a common load impedance 5. They may be pentodes or other tubes having high plate impedances, e. g. high output impedances. It is also desirable that the stray inter-electrode capacity be low so that the useful frequency range will not be limited unnecessarily.

As will be more apparent from the following additional descriptions of this invention, it is advantageous, though not essential, that the amplification factors of each of the tubes 3 and 4 be exactly the same. The gains of the two vacuum tube amplifier circuits including these tubes will be adequately equal if the tubes are reasonably identical, i. e. if they are a "matched pair" and if the other circuit elements of the amplifier circuits are matched elements. The gains of these two circuits will be adequately equal because of the selection of tubes with high output impedances and the arrangement of working them into a common load impedance of relatively low value. The gains of the vacuum tube amplifiers in such an arrangement will be small, i. e. the constant referred to above will be small, but inequalities in changes in these gains, due to aging and other variables, will be negligible since such changes themselves will occur within extremely narrow ranges.

The two output voltages from the magnitude balancer are fed, respectively, to the control grids of tubes 3 and 4 (Fig. 2), that is to say, between their respective control grids and ground. The plates of both tubes 3 and 4 are connected together and are connected both to alternating-current ground, such as that provided at the upper plate of by-pass capacitor 5a, and to B+ through a load impedance 5 which, as has been explained, preferably has a low impedance. The exact phase angle of the load impedance is of secondary importance. However, if the resistive component of the load impedance is many times as large as the reactive one, it will tend to extend the useful frequency range of this apparatus. Accordingly, preferably the load impedance should be a resistor (of relatively low resistance).

The output of the adding circuit, as shown in Figs. 1 and 2, is connected to the input of an amplifier 6 which will hereinafter be designated as a meter needle positioning amplifier. This may be a conventional resistance-coupled amplifier adapted to pass a sufficiently wide band of frequencies so that it does not limit the usefulness of this device. The amplifier is included herein so that in actual use of this device the maximum operational flexibility is obtained. Otherwise, as will be seen below, it is not an essential element according to this invention. The output of amplifier 6 is connected to the input of a rectifier 7 which may be of the type of any one of numerous conventional rectifiers that are well known to the art. The particular type employed for any specific embodiment may be selected with reference to the desired frequency range, economy of construction, and other requirements which arise as routine design problems. The output of the rectifier is fed to an indicator 8, which may be a direct-current meter, such as a microammeter. As will be apparent from the further explanation which follows, the scale of the indicator may be calibrated directly in degrees (of phase difference). It can be demonstrated mathematically and has been ascertained in actual tests that the calibrations will not be linear. The scale may be calibrated from 0° to 180° in one angular direction, such as counterclockwise, and it will be seen that a portion of the scale, such as the portion between 0° and 90°, will be crowded. Calibrations in the opposite direction, such as clockwise, which cover an equal range, i. e. from 0° to 180°, will be crowded in a portion which indicates phase differences of a different order, such as between 90° and 180°. Whereas one of these scales indicates the phase difference between two input voltages (under test) when they are fed into the magnitude balancer by a certain connection of the input leads, the other scale will indicate it, if the connection is changed by reversing the leads which feed one of the input voltages into one of the amplifiers of the magnitude balancer. This permits the operator to change the direction of indicator needle deflection which causes the phase angle data to appear as an expanded portion of one of the scales so that he can enjoy greater convenience in reading off the data from the indicator.

The phase shifting characteristic of amplifier 6 is of no importance, inasmuch as the functioning of this device is based upon a measurement of differences in voltage magnitudes, i. e. the difference in the magnitude of the voltage across load impedance 5 when one input is fed into the magnitude balancer and the magnitude of the voltage across that impedance when both voltages under test are fed to the magnitude balancer.

The foregoing portion of this application has dealt primarily with the structure of an embodiment of this invention. The portion which follows is intended to explain some of the principles of its operation.

It may be assumed that the magnitude of the alternating current through load impedance 5 is a function of the magnitudes of the alternating-current components of the plate currents of tubes 3 and 4 and of their phase difference.

Stated as an equation:

$$\left.\begin{array}{l}\text{Total current}\\ \text{through load}\\ \text{impedance}\end{array}\right\} = i = \sqrt{(i_1 + i_2 \cos \alpha)^2 + (i_2 \sin \alpha)^2}$$

where $i_1$ and $i_2$, respectively, represent the magnitudes of alternating current components of the currents through tubes 3 and 4 where $\alpha$ represents the phase difference between the currents.

It may be assumed that the stages are so built that the phase difference between the currents is exactly the same as the phase difference between the input voltages. Therefore, the magnitude of the current through load impedance 5 is a function of the magnitudes of $i_1$ and $i_2$ and of the phase difference between the input voltage to the adding circuit.

If K represents the ratio of the magnitudes of the input voltages to the tubes of the adding circuit and $\beta$ represents the ratio of the gains of these tubes (tubes 3 and 4), then it can be stated mathematically that:

$$i_2 = i_1 \beta K < \alpha$$

where $\alpha$ is the phase difference between the voltages in question and also between $i$ and $i_2$.

If this value of $i_2$ be substituted in the first equation, it takes the form:

$$i = \sqrt{(i_1 + i_1 \beta K \cos \alpha)^2 + (i_1 \beta K \sin \alpha)^2}$$

which can be reduced to the expression:

$$i = i_1 \sqrt{1 + 2\beta K \cos \alpha + \beta^2 K^2}$$

It will be seen that this expression, in effect, says that the magnitude of the total current through the load impedance is a function of the current through one of the tubes, for example, tube 3, the ratio of the gains of two tubes, the constant K, and the phase angle which is being sought.

The principle followed herein is to vary the magnitude of the current $i$ by supplying the adding circuit first with one input voltage only, and then with both of them, and to arrange the circuit so that the change in the magnitude of $i$ which results can be considered as a function only of the angle $\alpha$. Then, an indicator whose needle will be deflected in proportion to that change in magnitude can be calibrated directly in degrees of phase difference. For this reason, it is obviously desirable that $\beta$ and K (which enter into the value of the magnitude of $i$) should have a value of unity (so that $\beta K = 1$). Of course, the ratio of the gains of the vacuum tube amplifiers including tubes 3 and 4, $\beta$, can be made to remain constant within certain limits, i. e. to be constant unless one or both of the voltage inputs to the tubes of the adding circuit are inordinately large or small. Accordingly, the procedure outlined may be followed even if $\beta \neq 1$ and the magnitude of $i$, will still be a function of the phase angle and the constant K. Moreover, it would be feasible to extract information regarding the phase angle from a device in which $\beta \neq 1$ even though no magnitude balancer were used, i. e. even if K also were not reduced to unity. However, it simplifies matters to make the product $\beta \cdot K$ equal to unity, for, when this is done, the variations are a straight forward function of $\alpha$ only.

Moreover, there is another advantage in having $\beta K = 1$. It may be mathematically demonstrated, and has been confirmed experimentally that if the term $\beta K = 1$, the variations in $i$ for differences in phase from 0° to 180° will extend between limits of $2 \cdot i$ and 0, the former being obtained when the cos $\alpha = +1$ ($\alpha = 0°$), and the latter when cos $\alpha = -1$ ($\alpha = 180°$). Thus, when $\beta K = 1$, a maximum needle deflection in the indicating device is obtained and the limits of the scale calibrated on the device may be the convenient values, 0° and 180°. Therefore, in preferred embodiments of this invention, the magnitude balancer is used to obtain inputs to the adding circuit which are equal in magnitude and the two vacuum tubes in the adding circuit are selected and arranged to have equal gain.

Figure 3:
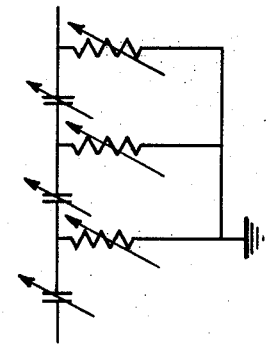
Fig. 3 is a representation of a phase shifting network which in some embodiments is incorporated into the output circuit of each of the amplifiers of Fig. 1.

As has been noted above, it is possible that the amplifiers in the magnitude balancer may cause unequal phase shifts when they include tuned input and output circuits and they are set to cause unequal amounts of amplification. It will be possible to eliminate this inequality in phase shifts, for a particular condition of relative gain adjustments, by the use of phase shifting networks of any known kind, for example, of the kind shown in Fig. 3 in the output circuits of amplifiers 1a and 1b by feeding voltages known to be exactly in phase into the two inputs of the balancer, and by following the procedure described below. Any needle deflection on indicator 8 under these conditions would be in part a function of any relative phase difference between the outputs of magnitude balancer 1. Therefore the phase shifting network included in the output circuit of each of the amplifiers 1a and 1b should be manipulated to secure maximum needle deflection indicating that the outputs, like the inputs are exactly in phase. Where such manipulation causes the needle to be deflected so far as to go off scale, the gain of amplifier 6 can be reduced and the manipulation thereafter continued until a true maximum deflection is found. Once this has been done, the entire system, for a given frequency, would be set up for accurate phase measurements with respect to two voltages under test which require particular gain settings of amplifiers 1a and 1b.

As is well known, the amplifiers in this device will have good phase characteristics and reasonably good pass band characteristics if they have untuned input and output circuits. However, as mentioned above, tuned circuits may be used further to extend the frequency range where this is desirable. In addition to, or in place of, potentiometers at the inputs of amplifiers 1a and 1b (potentiometers to be used for producing over-all attenuation when desired), these amplifiers may be arranged to have any of a variety of conventional gain controls, such as cathode bias gain controls. They should be built as exactly alike as possible within the limitations of normal manufacturing practices. The tubes employed in blocks 1a and 1b may be variable mu tubes, if desired, because of the suitability of such tubes for achieving certain gain control characteristics.

The tubes should have small inter-electrode capacitances for reasons already described above.

In operation, this device may be employed in the following manner:

(a) The two voltages under test are fed to the two inputs of the balancer and are adjusted to have equal magnitudes at its output. This can be done by adjusting the gain of amplifier 1a (and/or adjusting the setting of its input potentiometer) while switch 1c is closed and switch 1d is open until indicator 8 yields some convenient reference reading and thereafter adjusting the gain of amplifier 1b (and/or adjusting the setting of its input potentiometer) while switch 1d is closed and switch 1c is open until indicator 8 yields the same reading. (The steps to compensate for unequal phase shifting will be taken next, if necessary.)

(b) Either switch 1c or switch 1d is closed while the other is opened.

(c) The gain of amplifier 6 is adjusted so that the indicator needle is deflected to the 120° position.

(d) The other switch is also closed.

(e) The phase difference is read off in degrees directly from the scale of the indicator.

(f) As has been explained above, the leads feeding one of the input voltages to the adding circuits may be reversed, if desired, so that the indicator deflection will place the needle over a portion of the scale where the calibrations are expanded. Other suitable switching means may be built into the input circuits of amplifiers 1a and 1b to make this operation convenient. These means are not shown in the drawing, since they may be of any conventional type.

It is obvious that a device according to this invention will measure phase difference between voltages in or below the audio range and also in very much higher frequency ranges, such as the radio frequency one. In fact, it can be adapted to measure phase difference of voltages ranging continuously over a very wide frequency band.

Obviously, if desired, separate indicating means may be included in this apparatus for assisting in the magnitude balancing adjustment.

It is also obvious that if 120° be selected for the "reference reading" mentioned above in step (a) then the adjustment of step (c) will become unnecessary. This, of course, shows how amplifier 6 is really not essential herein but merely adds to the flexibility of the present apparatus.

It is obvious that other embodiments may be constructed varying in details of their circuits from the embodiment described herein, while, at the same time, they follow the principle of this invention. Such devices are considered to be within the scope of this invention as described herein and claimed in the appended claims.

What I claim is:

1. A direct reading phase difference indicator for indicating the difference in phase between two alternating voltages existing at two points comprising a magnitude balancer having two input circuits, switching means for connecting and disconnecting the two input circuits to the two points, the magnitude balancer also having two output circuits and two voltage varying means, each of the voltage varying means being connected between one of the two input circuits and one of the two output circuits, the voltage varying means being adapted independently to vary the magnitudes of the two alternating voltages over relatively wide ranges while substantially preserving their wave forms and thereby to equalize said magnitudes, controllable phase shifting means adapted controllably to compensate for any change in the relative phase of the two alternating voltages caused by the voltage varying means so that the two voltages at said two output circuits have the same phase difference as the two voltages at the two input circuits, voltage adding means adapted to add vectorially two alternating voltages and having two input circuits and a common output circuit, each of the input circuits of the adding means being connected to one of the output circuits of the magnitude balancer, a rectifier having an input and an output, the input of said rectifier being connected to the common output circuit of the adding means, indicating means adapted to produce an indication proportional to magnitude of the direct-current component of the output of the rectifier, the indicator having an input, the input of the indicator being connected to the output of the rectifier.

2. A direct reading phase difference indicator as in claim 1, in which the adding means includes two amplifiers, each of said amplifiers including at least one vacuum tube, said vacuum tubes having relatively high output impedances, said amplifiers having separate input circuits and a common output circuit including a common load impedance, the common load impedance being of relatively much lower impedance than the output impedances of the tubes, the two input circuits of the adding means respectively comprising respectively the input circuits of the two amplifiers, the indicator also including a scale directly calibrated in degrees of phase difference and a movable needle cooperating therewith, and the phase difference indicator also comprising a needle-positioning amplifier connected in series between the common output circuit of the adding means and the input of the rectifier.

JOSEPH C. SPINDLER.

REFERENCES CITED

The following references are of record in the file of this patent:

UNITED STATES PATENTS

| Number | Name | Date |
|---|---|---|
| 2,137,846 | Klutke | Nov. 22, 1938 |
| 2,225,348 | Mikelson | Dec. 17, 1940 |
| 2,318,248 | Minton | May 4, 1943 |
| 2,349,261 | Ginzton | May 23, 1944 |
| 2,394,892 | Brown | Feb. 12, 1946 |
| 2,411,916 | Woodyard | Dec. 3, 1946 |
| 2,416,517 | Farrow | Feb. 25, 1947 |